United States Patent [19]

Hamma

[11] Patent Number: 5,248,960
[45] Date of Patent: Sep. 28, 1993

[54] SIGNAL GENERATING/POSITION CONTROLLING SYSTEM

[76] Inventor: John Hamma, 23 Sunnyside Ct., Milford, Conn. 06460

[21] Appl. No.: 889,366

[22] Filed: May 28, 1992

[51] Int. Cl.$^5$ .............................................. G09G 3/02
[52] U.S. Cl. .................................... 345/157; 345/156
[58] Field of Search ..................... 340/706, 707, 710; 33/1 M, 1 N, 1 CC, 1 PT, 1 MP

[56] References Cited

U.S. PATENT DOCUMENTS

| | | | |
|---|---|---|---|
| 3,559,307 | 2/1991 | Barrekette et al. | 340/707 |
| 4,177,354 | 12/1979 | Mathews | 340/707 |
| 4,500,749 | 2/1985 | Khoshnevis | 33/1 M |
| 4,553,842 | 11/1985 | Griffin | 33/1 M |
| 4,813,146 | 3/1989 | Jaluzot | 33/1 PT |
| 4,852,055 | 7/1989 | Lapeyre | 340/710 |
| 4,922,618 | 5/1990 | Osborn et al. | 33/1 MP |

Primary Examiner—Alvin E. Oberley
Assistant Examiner—Minsun Oh
Attorney, Agent, or Firm—Melvin I. Stoltz

[57] ABSTRACT

By providing a pointer assembly which is easily mounted to a computer terminal or screen and is movable from a first position to any second position on the terminal or screen, with the position of the pointer being precisely measured and transmitted to the computer, a unique, easily employed signal generating and position controlling system is realized. By incorporating a switch in the pointer assembly or in association with the pointer assembly, any individual is capable of employing the system of this invention quickly, easily, and accurately, without requiring training or expertise. In the preferred embodiment, the pointer assembly is movable both arcuately and longitudinally, relative to a fixed initial position, with any movement from the initial position being precisely measured to determine the desired, user-selected position.

13 Claims, 2 Drawing Sheets

SIGNAL GENERATING/POSITION CONTROLLING SYSTEM

TECHNICAL FIELD

This invention relates to a signal generating/position controlling system, and more particularly to a signal generating/position controlling system for use with a computer terminal display or screen for enabling a cursor or image to be moved to any desired position on the display or screen.

BACKGROUND ART

Due to the increasing use and popularity computers have enjoyed, new demands have been placed on computer systems and suppliers for hardware and software which are easily employed by a novice, without requiring training or experience. Although various improvements have been made, one area that has continued to suffer from any substantial improvement is the control systems used for changing the position or location of a cursor or image on a computer display terminal or screen. Although numerous systems and alternate designs have been developed for generating the signals needed to control the movement of the cursor or image on the terminal display or screen, these prior art systems have been incapable of satisfying the needs of most casual or infrequent computer users.

In order to free the user from having to use a keyboard, prior art signal generating/position controlling systems have been developed which interface with the computer to controllably move the cursor or image to any desired position on the display or screen.

Typically, these prior art signal generating/position controlling systems employ the well-known roller-ball or tractor-ball constructions which are mounted in a housing which is manually moved by the user to cause the cursor or image on the display or screen to move accordingly. Although these systems have been developed with numerous alternate constructions and enhancements, the prior art signal generating/position controlling systems are unable to satisfy the consumer needs.

Most prior art systems are substantially identical in construction, using a rolling ball as the means for generating the necessary signals to control the position of the cursor or image on the screen and designate the precise location desired when information input into the computer is sought. In employing these prior art devices, the housing containing the roller ball or tractor ball is manually moved by the user over a surface, while the user visually observes the position of the cursor or image displayed on the screen. By physically manipulating the roller ball bearing housing in various directions, the position of the cursor or image on the screen in altered, until the precisely desired location is attained. Once the desired location is reached, switch means associated with the housing are activated, in order to input the precise location as the desired point. With this input having been made, the software employed in the computer system recognizes the precise position and proceeds with the next desired operation.

Although these prior art devices are able to generate the necessary signals for controlling the movement of the cursor or discreet image on the terminal display or screen, in a manner which enables the cursor or image to be positioned anywhere in any desired location thereon, the use of these prior art constructions are difficult to master and are incapable of allowing individuals to conveniently, quickly, and easily place the cursor or image in the precisely desired location.

In addition, these prior art systems suffer from two other particularly important heretofore insurmountable drawbacks. First, in order to employ these prior art systems, a substantial amount of area is required, usually with a specially designed pad. In order to optimize the use of these prior art systems, an accessory pad typically is purchased, with the pad being positioned directly adjacent the computer terminal and keyboard. This requires the user to forego employing this important area for any purpose, other than to maintain this vacant pad area for using the roller ball or tractor ball member thereon.

The second additional problem found in these prior art systems is their complete inability to be effectively employed in association with lap-top or portable computers. With the increasing popularity of lap-top computers, signal generating/position controlling systems for use therewith are in great demand, with the prior art systems incapable of fully satisfying this demand.

In particular, some prior art systems have offered portable or built-in tractor ball or roller ball systems incorporated within the computer or mounted to the side of the computer. However, these prior art systems are incapable of providing the complete signal generating/position controlling operational ease being sought by consumers.

Most individuals, particularly individuals who use computers less frequently, have found extreme difficulty in using the prior art systems to manipulating the cursor or image on the screen to the precisely desired location in a comfortable, convenient manner. As a result, most infrequent uses of computers tend to avoid the use of the roller or tractor ball systems due to the inherent difficulties encountered with their use.

Therefore, it is a principal object of the present invention to provide a signal generating/position controlling system which is capable of being used by all individuals quickly and easily, without difficulty.

Another object of the present invention is to provide a signal generating/position controlling system having the characteristic features described above which is able to produce output control signals representing the precise polar coordinates of any selected position on a terminal display and input the desired polar coordinate information to the computer for subsequent use.

Another object of the present invention is to provide a signal generating/position controlling system having the characteristic features described above which is small, compact, and easily mounted directly on a terminal housing or computer display, thereby eliminating the need to use any space or pad adjacent the terminal and keyboard.

Another object of the present invention is to provide a signal generating position/controlling system having the characteristic features described above which is capable of being used by all individuals, regardless of their level of expertise.

Another object of the present invention is to provide a signal generating position/controlling system having the characteristic features described above which is easily mountable to and employed with lap-top or portable computer systems.

A further object of the present invention is to provide a signal generating/position controlling system having the characteristic features described above which is employed by having the user merely position a portion of the system in the precisely desired location and activating switch means to inform the computer of the desired location.

Other and more specific objects will in part be obvious and will in part appear hereinafter.

SUMMARY OF THE INVENTION

The prior art drawbacks and difficulties are completely overcome in the present invention by eliminating the need for roller balls or tractor balls as well as eliminating the need for visual feed back from the terminal display in order to select the desired position for the cursor or image. In the present invention, the precisely desired location and position of the cursor or the image on the display or screen is controlled directly by the user merely placing a pointer on the screen where the desired input location is sought. In this way, manual manipulation of a device separate from the computer terminal with visual feed back being required to position the cursor or the image is completely eliminated.

As a result, a small, compact unit is obtained which is easily mounted directly on the terminal. In this way, a system easily used with lap-top or portable computers is attained and use of the previously required area and pad adjacent the terminal becomes unnecessary.

In the present invention, a small, compact, signal-generating/position controlling system is attained by mounting a movable pointer on the end of a pivotable arm, with the pointer being connected to a spring-biased flexible member which is easily extendable from a fully wound or coiled position to any extended position desired by the user. By directly measuring the arcuate movement of the pivotable arm, while simultaneously measuring the distance the pointer is moved from its home position, when the flexible member is fully wound, and the precise location of the pointer on the display or screen is easily determined. As with prior art systems, the measured data is transmitted to the computer, which processes the information and establishes the precise location of the pointer on the screen. The user merely needs to touch the screen in the desired location to generate a transmit signal to the computer for designating any desired location.

Although the present invention is capable of being constructed in a plurality of alternate equally efficacious embodiments, the preferred construction employs a spring-biased reel or spool on which the flexible member or signal carrying wiring is wound, with the free end thereof connected to the manually movable pointer. In this way, any movement of the pointer by the user causes the flexible member to be dispensed from the spool by rotating the spool against the spring biasing forces. By precisely measuring the rotational movement of the spool, the amount of wire dispensed therefrom is known. With this information, the system or computer is able to precisely establish the single arcuate path along which the pointer has been positioned.

In order to establish the precise location of the pointer, one additional data input is required. This data is obtained in the present invention by mounting the pointer to the end of an elongated arm which is pivotal relative to the fixed support housing. With the arm being able to pivot through an arc of close to 180°, any position on the computer terminal display or screen is easily reached by the pointer. In addition, as part of this construction, pivoting movement measuring means are mounted in association with the pivot arm to precisely measure the arcuate movement of the arm. With the information provided by the pivoting movement measuring means, the system or the computer is able to establish the precise location sought by the user.

By employing the present invention, the prior art drawbacks are eliminated and a signal generating/position controlling system is attained which provides a simple, small, compact system which is easily used by all individuals with equal efficacy. With little or no training, any individual is now able to control the position of a cursor or image on a computer display or screen, including lap-top and portable computers, and select any desired position as input information for the computer.

The invention accordingly comprises the features of construction, combination of elements and arrangement of parts which will be exemplified in the construction hereinafter set forth and the scope of the invention will be indicated in the claims.

THE DRAWINGS

For a fuller understanding of the nature and objects of the invention, reference should be had to the following detailed description, taken in connection with the accompanying drawings, in which.

DETAILED DESCRIPTION

Figure 3:
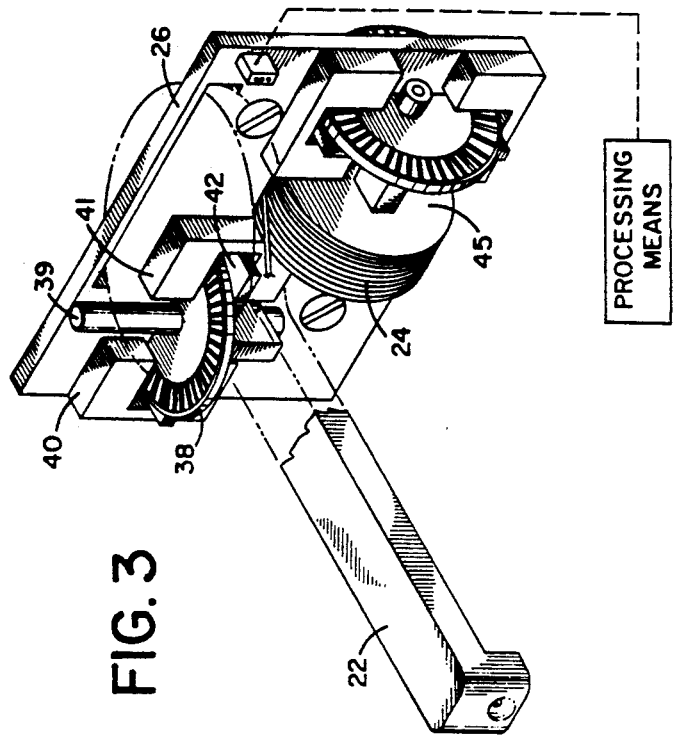
FIG. 3 is a perspective view, partially broken away, showing the preferred construction of the signal generating/position controlling system of the present invention, with the housing thereof removed.
Figure 1:
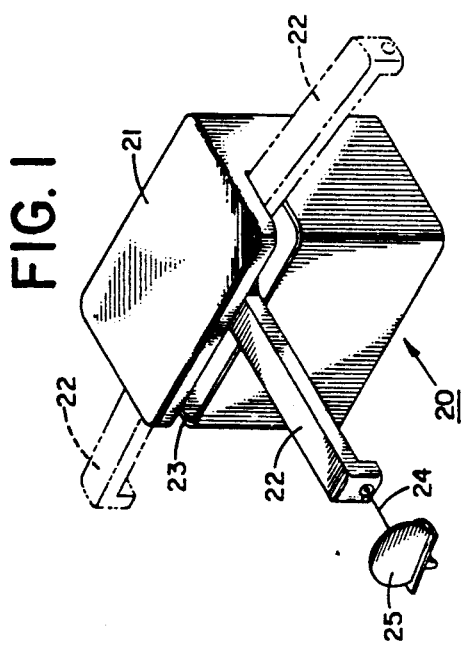
FIG. 1 is a perspective view showing the preferred embodiment of the signal generating/position controlling system of the present invention.

In FIG. 1, the preferred embodiment of small, compact, easily used, efficient signal generating/position controlling system 20 of the present invention is depicted. In this construction, signal generating/position controlling system 20 comprises a housing 21 within which elongated arm 22 is pivotally mounted. As depicted in FIG. 1, housing 21 incorporates an elongated slot 23 formed therein within which arm 22 is capable of arcuate pivoting movement throughout its arc of rotation.

In the preferred construction, elongated arm 22 is capable of pivoting through an arc of about 175°. As is more fully detailed below, by providing arm 22 with an arc of rotation of close to 180°, any desired position on the computer display/screen is able to be easily reached, regardless of the mounting location of housing 21.

In order to complete the assembly of signal generating/position controlling system 20, a position designating pointer 25 is provided and is movably interconnected to housing 21 by elongated, continuous flexible member 24 contained within housing 21. As detailed below, flexible member 24 is preferably mounted on a spring biased spool or reel, in a manner which enables the precise length of flexible member 24 withdrawn from the spool to be constantly measured.

By employing the signal generating/position controlling system of the present invention, novices as well as experts are able to easily provide the precise coordinate location of a cursor or image of a computer display/screen and transmit the precisely desired coordinate location to the computer for processing. By merely withdrawing the pointer 25 from its stored position directly adjacent arm 22, and placing the pointer in the desired location, the precise coordinate signal is transmitted to the computer.

Figure 2:
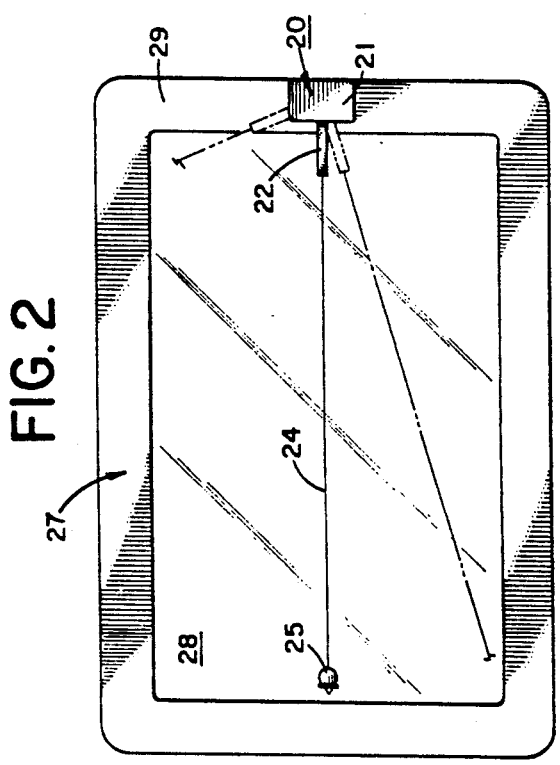
FIG. 2 is a front elevation view depicting the signal generating/position controlling system of the present invention mounted in position in direct association with a typical computer terminal display/screen.

In FIG. 2, a typical installation of signal generating/position controlling system 20 of the present invention is depicted. As shown therein, a typical computer terminal 27 is shown incorporating a screen or information display surface 28 which is peripherally surrounded by a bezel or flange 29. In order to employ the signal generating/position controlling system 20 of the present invention, signal generating/position controlling system 20 is mounted directly on flange or bezel 29 in cooperating association with display/screen 28.

In its normal, unused position, pointer 25 is maintained directly against the terminating end of elongated arm 22. However, when in use, as depicted in FIG. 2, pointer 25 is moved to any desired position on screen 28 for designating the desired input to the computer. In moving pointer 25 to the desired position, flexible member 24 is withdrawn from housing 21, with dispensed length being continuously measured, as is fully detailed below.

As shown by the phantom positions in FIG. 2, arm 22 is arcuately movable relative to housing 21, in order to assure that any desired position or location on screen 28 can be easily reached by pointer 25. By measuring the arcuate movement of arm 22, along with the length of wire 24 withdrawing from housing 21, the precise position of pointer 25 at any location on screen 28 is easily determined.

As is fully detailed below, when the desired position has been reached by the user, switch means are activated in pointer 25. This switch activates the system to transmit a signal corresponding to the coordinates of the position where pointer 25 was activated. In this way, the precise cursor location on screen 28 desired by the user is quickly and easily transmitted to the computer for use.

By employing this invention, the difficulties and drawbacks previously encountered with manual manipulation of roller balls, tractor balls, or other cumbersome mechanical devices, are completely eliminated and a simple, easily employed, readily understood and efficient position indicating system is realized. By merely moving the pointer to the precise location and activating the switch, the desired position is transmitted to the computer. In this way, speed and accuracy are enhanced and greater usability of the computer and cursor or image-based programs are more readily employable by individuals who presently avoid such programs, due to the difficulties presently encountered from the requisite visual feed back of prior art constructions.

The signal generating/position controlling system of the present invention may be constructed in a variety of alternate configurations and arrangements in order to obtain the desired interactive, computer based information display and cursor control desired. The preferred construction of the present invention is shown in FIGS. 3-6, and by referring to these Figures, along with the following detailed disclosure, this preferred construction and operation can best be understood.

As discussed above, in order to provide the computer with sufficient information to determine the precise location of pointer 25 at each and every position on screen 28 of computer terminal 27, the arcuate movement of elongated arm 22 must be measured, along with the length of flexible member 24 dispensed from housing 21 of signal generating/position controlling system 20. With this information, the precise position of pointer 25 is easily determined.

In the preferred embodiment, in order to establish a small, compact system, all of the components forming signal generating/position controlling system 20 are mounted to a single support plate or integrated circuit board 26. By employing conventional technology, data transmission between these components is easily attained, along with the transmission of the location data to processing means incorporated within housing 21 or to the computer for processing by software associated therewith.

In order to attain one required portion of the necessary information, elongated arm 22 is integrally connected to or integrally formed with an enlarged, substantially circular shaped head portion 30. In the preferred embodiment, head portion 30 and arm 22 comprise a single integrally formed component which is pivotally mounted to housing 21 by a support pin member 35 formed on head portion 30 at the central axis thereof. In this embodiment, pin member 35 is secured in rotational journaled engagement with pin receiving sleeve 36 mounted to housing 21. In this way, arm 22 and circular head portion 30 are able to easily achieve the desired arcuate movement relative to housing 21.

In order to precisely measure the arcuate movement of elongated arm 22, a multi-apertured encoder wheel 38 having an elongated shaft 39 is rotationally mounted in cooperating association with head portion 30. In addition, a portion of elongated shaft 39 is positioned in abutting, frictional contacting engagement with the side edge of head portion 30.

By positioning shaft 39 in frictional contacting engagement with head portion 30, any movement of elongated arm 22 causes head portion 30 to pivot about the central axis of support post 35, which pivoting motion causes shaft 39 to rotate about its central axis due to the frictional contacting engagement between shaft 39 and head portion 30. Furthermore, since shaft 39 is integrally connected to encoder wheel 38, the rotational movement of shaft 39 also causes encoder wheel 38 to rotate, thereby providing a direct, measuring response to the movement of elongated arm 22.

In order to precisely track the rotational movement of encoder wheel 38, for assuring that any arcuate movement of arm 22 is measured with the requisite precision, encoder wheel 38 is peripherally surrounded by two photo sensor assemblies 40 and 41. As is known in the prior art, each of the photo sensor assemblies 40 and 41 comprise a pair of cooperating members, one of which emits a continuous beam of light, the presence, or absence of which is measured by the juxtaposed, spaced, cooperating member thereof Since encoder wheel 38 incorporates a plurality of equally spaced apertures formed therein, any rotational movement of encoder wheel 38 causes the beam of each photo sensor to be broken, each time an aperture zone passes through the beam associated therewith. By counting the number of apertures passing through the beam of each photo sensor assembly in response to a given arcuate movement of elongated arm 22, the precise arcuate distance through which arm 22 has moved is easily determined.

Although a single photo sensor 40 or 41 could be employed, it is preferred that two photo sensors 40 and 41 are used to enable the system to directly measure the direction in which encoder wheel 38 is being rotated. With only one photo sensor being employed, the direction of rotation is not able to be directly measured. However, by employing photo sensors 40 and 41, the direction of movement of encoder wheel 38 is easily determined as well as the precise distance through which arm 22 is moved.

In order to further enhance the precision measurement of encoder wheel 38, wall member 42, commonly employed in the art, is employed. Wall member 42 incorporates two slots formed therein at each end thereof, with one slot aligned with photo sensor light beam 40 and the second slot aligned with the light beam from photo sensor 41. In this way, the measuring capability of photo sensors 40 and 41 are enhanced and the movement of encoder wheel 38 is measured with greater precision and accuracy.

In providing the second required data input or information to enable the signal generating/position controlling system of the present invention to establish the precise coordinates of the pointer at any desired position on the computer terminal display or screen, signal generating/position controlling system 20 of the present invention is constructed with pointer 25 interconnected to housing 21 by flexible member 24. Flexible member 24 may be formed from a plurality of alternate materials, without departing from the scope of this invention. However, in the preferred embodiment, flexible member 24 comprises a continuous length of flexible wire material incorporating two insulated conducting members therein. In addition, elongated, continuous, flexible member 24 is preferably wound about a holding spool or reel 45 which is rotationally mounted to IC board 26.

In addition, flexible member holding reel 45 is constructed with a spring biasing member incorporated therein, in order to continuously urge reel 45 into its fully wound position. In this way, pointer 25 is normally maintained in a fully retracted position, in abutting contact with elongated arm 22. As is detailed below, this fully retracted position is electronically set as the home position, in order to assure that any movement of pointer 25 from the fully retracted position is accurately measured.

Figure 5:
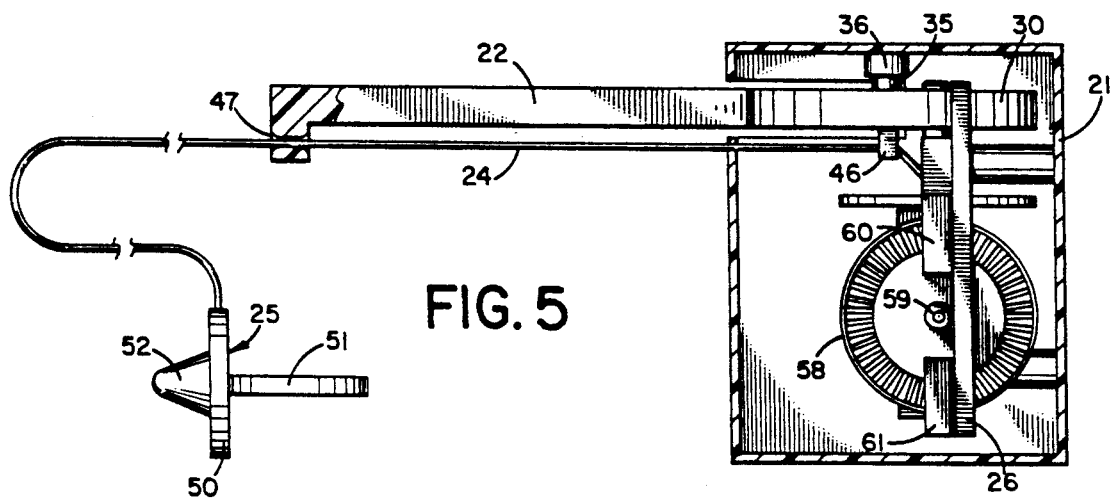
FIG. 5 is a side elevation view, partially in cross section, of the signal generating/position controlling system of the present invention.
Figure 6:
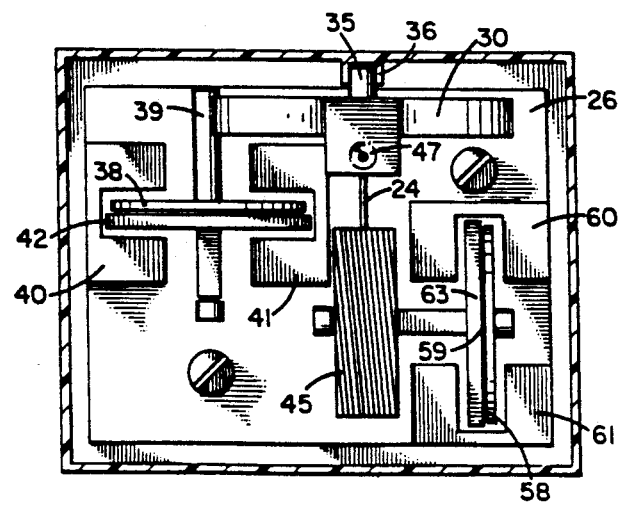
FIG. 6 is a front elevation view, partially in cross section, of the signal generating/position controlling system of the present invention.

As best seen in FIG. 5, flexible member 24 extends from reel 45 through an islet or holder 46 mounted to head portion 30 on the opposed surface from support pin 35. In addition, in the preferred embodiment, flexible member holder 46 is positioned coaxially with upstanding post 35, in order to assure consistent, accurate measurement of any movement of flexible member 24.

In the preferred embodiment, flexible member 24 extends through aperture 47 formed at the terminating end of elongated arm 22 and is connected directly to pointer 25. As discussed above, flexible member 24 preferably incorporates two electronically independent wires formed therein in order to carry an electronic signal from pointer 25 to the signal processing means. In order to enable any desired signal to be transmitted along flexible member 24, pointer 25 preferably incorporates a conventional switch formed therein, which completes a circuit and transmits the desired signal along flexible member 24.

Pointer 25 may incorporate any desired configuration without departing from the scope of the present invention. The only principal requirement for pointer 25 is to be small, compact, and easily handled by the user, while also being directly connected to the terminating end of flexible member 24 in order to assure that any movement of pointer 25 is precisely measured. By referring to FIGS. 4 and 5, along with the following detailed discussion, the construction and operation of the preferred embodiment of pointer 25 can best be understood.

To provide a simple, easily constructed, and easily employed pointer configuration, pointer 25 of the present invention is constructed with a support base 50 to which the terminating end of flexible member 24 is securely affixed. Enlarged holding plate 51 is mounted to one surface of base 50 and comprises, in the preferred embodiment, a substantially circular shape dimensioned for being easily held between the finger and thumb of the user. Finally, the construction of pointer 25 is completed by securely mounting a substantially conical shaped tip member 52 to the opposed surface of base 50.

By employing this construction, a simple, easily manufactured, easily employed pointer 25 is attained. In the preferred embodiment, base 50 comprises a transparent material in order to enable conical tip 52 to be easily viewed by the user, thereby assuring that the terminating end of tip 52 is placed in the precisely desired location. In an alternate construction, as depicted in FIG. 1, base 50 can be constructed with a substantially semicircular shape, thereby enabling the terminating end of conical tip 52 to be easily viewed directly, without requiring its observance through transparent base 50.

In order to carry the desired signal from pointer 25 to the signal processing means, one embodiment of the present invention mounts a switch in conical tip 52, which is activated by compressing tip 52. In this way, once the desired position has been established, the user merely presses the terminating end of conical tip 52 against the computer terminal display or screen. This pressing action causes contacts within tip 52 to close and transmit a signal to the processing means for designating that precise spot as the desired location. This signal, along with the location data are automatically, transmitted to the processing means and the computer.

Figure 4:
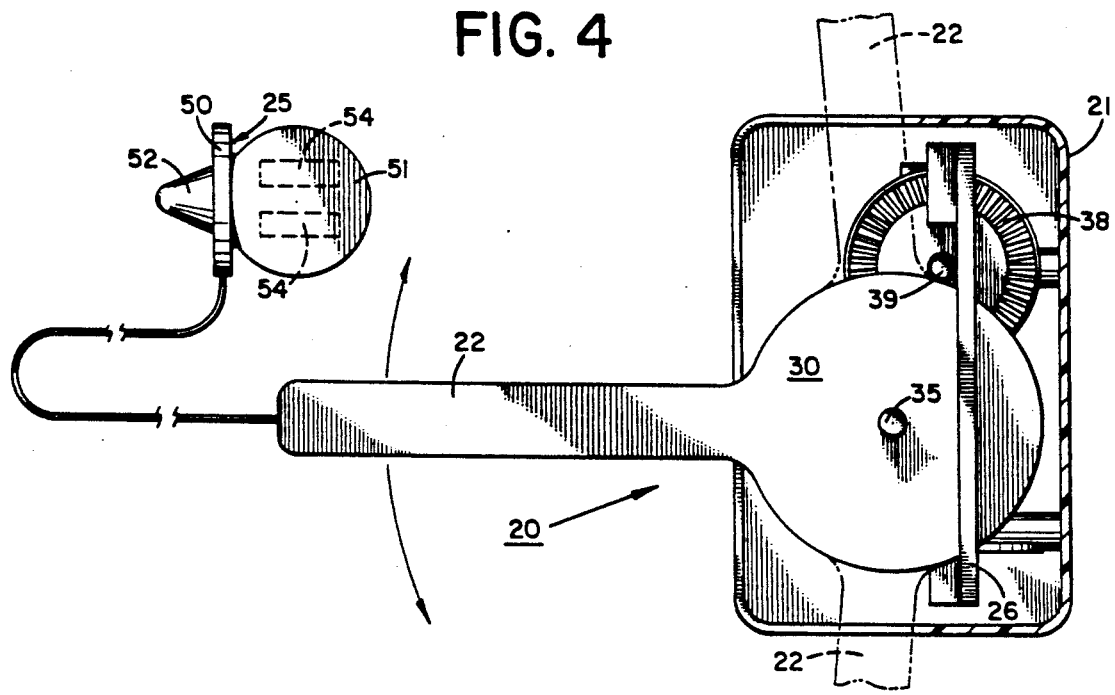
FIG. 4 is a top plan view, partially in cross section, of the signal generating/position controlling system of the present invention.

In an alternate construction, as generally depicted in FIG. 4, switch means 54 are mounted in holding portion 51 of pointer 25 to enable the user to activate switch means 54 whenever desired to transmit the selection signal to the processing means associated therewith. In this embodiment, switch means 54 may comprise one or a plurality of switch members similar to those used in present roller ball constructions, in order to provide one or more different signals to the processing means. However, at least one of the switch means 54 is employed to transmit the signal to the processing means for designating the precise location at which pointer 25 is placed as the exact location for being transmitted to the computer for subsequent processing.

As discussed above, pointer 25 is affixed to the terminating end of flexible member 24 with flexible member 24 being coiled or wound on spool 45, and with spool 45 being constructed for continuously urging flexible member 24 to be fully wound thereon. As a result, in its normal position, pointer 25 is maintained in abutting, contacting engagement with the terminating end of elongated arm 22.

In addition, whenever the user wishes to place pointer 25 at any desired location on the computer terminal display or screen, pointer 25 is moved to the desired location and placed in contact with the terminal or screen. This movement causes flexible member 25 to be drawn from spool 45 which rotates about its fixed axis, allowing a sufficient length of flexible member 24 to be dispensed from spool 45 to accommodate the desired position being sought by the user. In addition, since spool 45 is continuously biased against the dispensing of flexible member 24, flexible member 24 is continuously maintained taut, and spool 45 dispenses only the precise length of flexible member 24 required to reach the desired position.

In order to assure that the precise length or quantity of flexible member 24 being dispensed from spool 45 is accurately measured, encoder wheel 58 is employed and operated in a substantially identical manner to encoder wheel 38 detailed above.

In this embodiment, encoder wheel 58 is constructed with a shaft 59 extending therefrom, with wheel 58 and shaft 59 mounted for rotational movement about the central axis defined thereby. In order to assure that encoder wheel 58 precisely tracks any rotational movement of spool 45, shaft 59 extends to spool 45 and is integrally connected therewith. Consequently, any rotation of spool 45 to dispense a desired length of flexible member 24 simultaneously causes shaft 59 and encoder wheel 58 to rotate in direct, measuring relationship therewith.

In order to attain the necessary information output corresponding to the arcuate, rotational movement of spool 45 in dispensing flexible member 24, photo sensor assemblies 60 and 61 are securely mounted to IC board 26 at opposed diametric ends of encoder wheel 58. As discussed above in reference to photo sensor assemblies 40 and 41, each of the photo sensor assemblies, 60 and 61 produce a continuous beam at one portion thereof, with the opposed portion measuring the presence or absence of the beam.

When encoder wheel 58 is rotated, due to the movement of spool 45, the beam is continuously broken as each aperture formed in encoder wheel 58 rotates through the beam of each photo sensor assembly. With each of the photo sensor assemblies 60 and 61 independently connected to the processing means, through connections made along integrated circuit board 26, a signal is transmitted to the processing means corresponding to the precise arcuate rotation of spool 45 in dispensing a given length of flexible member 24.

By processing this information, either in the computer itself or in processing means associated with integrated circuit board 26, the arcuate movement of spool 45 is integrated with the information regarding the arcuate movement of elongated arm 22, to produce the precise coordinates at which pointer 25 is positioned on the computer terminal display or screen. Once the desired position is established, the signal transmitted to the computer and pointer 25 is either returned to its normally stored position adjacent elongated arm 22 or is moved to the next position desired by the user for inputting additional information into the computer system.

To assure that the rotational movement of multi-apertured encoder wheel 58 is precisely measured by photo sensor assemblies 60 and 61, this construction also incorporates a wall member 63 positioned directly adjacent encoder wheel 58. As discussed above in reference to wall member 42, wall member 63 preferably comprises two slots, formed therein at opposed ends, with each slot precisely aligned with the beam of light produced by one of the photo sensor assemblies. In this way, unwanted interference from other light sources are avoided and the precision, measurement of each and every aperture passing through the light beams associated with photo sensor assemblies 60 and 61 is enhanced and greater accuracy is assured.

In using the present invention most efficiently, housing 21 of signal generating system 20 is mounted in direct association with a computer in juxtaposed, spaced cooperating relationship with the terminal display or screen. Although housing 21 can be mounted at any position, either on the front surface of the terminal housing or on the side surface thereof, it has been found for convenience and effective use, housing 21 is preferably mounted substantially mid way along the side edge of the housing or mid way along the top edge of the housing. Typically, for most users who are right handed, mounting housing 21 along the right side edge is preferred.

The preferred construction of the present invention employs appropriate software to install signal generating/position controlling system 20 of this invention. Once loaded into the computer, the software enables the position of pointer 25 to be tracked and converts the information received from the processing means contained in housing 21 to the precise coordinate location for positioning the cursor or image on the display or screen. It has been found that once the initial set up has been established, and the signal generating/position controlling system 20 installed, the computer system will automatically move the cursor or the image being displayed to the location to which pointer 25 is manually directed by the user.

In order to assure that continuous tracking is accurately achieved, the initial set up requires the user to inform the computer that signal generating/position controlling system 20 has been installed and that the cursor position has been moved from its normal location, in the upper left hand corner of the screen, to the location at which the pointer is normally maintained, when in its non-extended position directly adjacent arm 22. Once this initial set up has been made, any movement of pointer 25 relative to housing 21 causes the computer system to move the cursor or image on the screen to the location to which pointer 25 has been moved, based upon the calculations made from the rotation of encoder wheels 38 and 58. Since these encoder wheels precisely and accurately track any movement of pointer 25 relative to the terminal display or screen, the computer is able to receive and process this information, converting the information to the precise coordinates for locating the cursor or image where desired by the user. As a result, a simple, easily employed signal generating system is attained whereby a cursor or an image on a computer display screen is easily controlled and manipulated by individuals having no computer expertise or knowledge. As a result, many programs based upon cursor movement or cursor input are now able to be fully and completely enjoyed by those individuals having little or no computer knowledge or expertise.

It is apparent from the preceding description that the present invention is capable of allowing any individual, regardless of the training level of the individual, to quickly and easily employ the signal generating/position controlling system of the present invention and input into the computer any desired position for a cursor or image being displayed on the computer terminal display or screen. By employing the present invention, no manual dexterity or expertise is required to enable the user to become adept at moving the cursor or the image to a desired position and no repeat movements must be made in order to be certain that the precise position is attained.

Clearly, any individual can quickly and easily grasp pointer 25 and move pointer 25 to the precisely desired position on the terminal display or screen. Once the precise position is reached, the signal is activated through the switch means formed in pointer 25, thereby informing the computer that the desired position has been selected. With this signal having been transmitted, the computer immediately determines the precise coordinates selected by the user and processes this information for use in the desired program. No expertise or training is required, and individuals with little or no computer knowledge are now capable of quickly and easily positioning and moving cursors or images about computer displays or screens with case and simplicity.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language might be said to fall therebetween.

Having described my invention, what I claim is now and desire to secure by Letters Patent is:

1. A signal generating and position controlling system for cooperative, mounted engagement directly with a computer and terminal display or screen whereby a user is able to directly selectably designate any desired position on the display or screen as an input location by merely touching the desired position on the display or screen, said system comprising
   A. pointer means
      a. positioned in direct association with the terminal display or screen,
      b. easily movable from a first stowed position adjacent the display or screen to a second input-designing position in direct contacting engagement with the display or screen,
      c. comprising a tip portion constructed for contacting the surface of the display or screen without damage thereto for designating the input position, and
      d. incorporating position designating switch means formed therein for transmitting an input position-selected signal corresponding to the precise position selected by user contact of the tip of the pointer means with the display or screen;
   B. holding means
      a. cooperatively associated with the pointer means for retaining the pointer means in its first position, and
      b. movably constructed to enable the pointer means to reach and contact any desired location on the display or screen;
   C. movement measuring means cooperatively associated with the holding means and constructed for
      a. precisely measuring the movement of said holding means, and
      b. generating a first signal corresponding to the movement measured thereby;
   D. distance measuring means cooperatively associated with the pointer means and constructed for
      a. precisely measuring the distance the pointer means is moved between its first position and its second position, and
      b. generating a second signal corresponding to the measured distance; and
   E. a housing
      a. mounted to the terminal in juxtaposed, spaced, cooperating relationship with the display or screen, and
      b. peripherally surrounding and enclosing the movement measuring means and distance measuring means;
whereby an efficient, easily employable signal generating and position controlling system is attained which is capable of being used by all individuals.

2. The signal generating position controlling system defined in claim 1, wherein said system further comprises
   F. processing means cooperatively associated with the movement measuring means and the distance measuring means for receiving the first and second signals and converting said first and second signals to a third signal corresponding to the precise coordinates at which the pointer means is located.

3. The signal generating/position controlling system defined in claim 2, wherein said processing means is further defined as being incorporated into the computer associated with the terminal display or screen.

4. The signal generating/position controlling system defined in claim 1, wherein said holding means is further defined as being pivotably mounted and comprising an arm portion extending from the pivotably mounted portion thereof.

5. The signal generating/position controlling system defined in claim 4, wherein said holding means comprises an enlarged disc portion which is pivotally mounted with said housing and the arm portion is integrally formed with the disc portion, extending from the disc portion to its terminating end outside of the housing, thereby providing said holding means arcuately movable relative to the housing.

6. The signal generating/position controlling system defined in claim 4, wherein said arm portion of said holding means is further defined as being pivotable through an arc of at least 150°.

7. The signal generating/position controlling system defined in claim 4, wherein said distance measuring means is further defined as comprising
   c. spool means rotationally mounted within said housing and incorporating spring biasing means, causing said spool means to be continuously biased for rotation in a first direction, and
   d. an elongated, continuous flexible member, a major portion of which is wound on said spool means with one terminating end securely retained with said spool means, and the opposed terminating end fixedly mounted to the pointer means.

8. The signal generating/position controlling system defined in claim 7, wherein said flexible member is further defined as comprising a continuous, elongated signal carrying wire rotationally wound on said spool means in a manner whereby any movement of said pointer means causes said spool means to rotate in a second direction, opposed to the biasing forces contained in the spool means.

9. The signal generating/position controlling system defined in claim 7, wherein said distance measuring means further comprises
   e. an encoder wheel rotationally mounted to said housing and interconnected with the spool means for rotationally moving in direct controlling relationship with the rotational movement of said spool means, and
   f. at least one photo sensor assembly cooperatively associated with the encoder wheel for measuring the rotation of said encoder wheel and producing a fourth signal corresponding to the rotational movement being measured.

10. The signal generating/position controlling system defined in claim 4, wherein said movement measuring means is further defined as comprising
    c. an encoder wheel rotationally mounted in said housing in cooperating, following relationship with said holding means for rotating simultaneously with the rotation of said holding means, and
    d. at least one photo sensor mounted in association with said encoder wheel for measuring the arcuate rotation thereof and generating an output signal corresponding to the arcuate movement of said encoder wheel.

11. The signal generating/position controlling system defined in claim 1, wherein said position designating switch means is further defined as being formed in the tip of the pointer means for activation upon contacting interengagement with the terminal display or screen.

12. The signal generating/position controlling system defined in claim 1 wherein said pointer means is further defined as comprising a holder with the tip integrally connected therewith and said switch means is further defined as being formed in the holder positioned for easy activation by the user.

13. The signal generating/position controlling system defined in claim 12, wherein said holder is constructed for assuring easy and complete visability of the tip in order to assure precise positioning and location where desired.

* * * * *